United States Patent
Cho et al.

(10) Patent No.: US 9,635,333 B2
(45) Date of Patent: Apr. 25, 2017

(54) WHITE BALANCING DEVICE AND METHOD OF DRIVING THE SAME

(71) Applicant: SAMSUNG ELECTRONICS CO., LTD., Suwon-si, Gyeonggi-Do (KR)

(72) Inventors: Sung-Kwang Cho, Seoul (KR); Tae-Chan Kim, Yongin-si (KR); Dong-Pan Lim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 90 days.

(21) Appl. No.: 14/613,951

(22) Filed: Feb. 4, 2015

(65) Prior Publication Data

US 2015/0326841 A1 Nov. 12, 2015

(30) Foreign Application Priority Data

May 8, 2014 (KR) ........................ 10-2014-0055088

(51) Int. Cl.
*H04N 9/73* (2006.01)
*H04N 5/20* (2006.01)
*G06T 5/00* (2006.01)

(52) U.S. Cl.
CPC ............. *H04N 9/735* (2013.01); *G06T 5/007* (2013.01); *H04N 5/20* (2013.01); *G06T 2207/20208* (2013.01)

(58) Field of Classification Search
CPC ..... H04N 9/735; H04N 5/2355; H04N 5/2356
See application file for complete search history.

(56) References Cited

U.S. PATENT DOCUMENTS

| | | | |
|---|---|---|---|
| 6,747,694 B1 * | 6/2004 | Nishikawa | H04N 5/2355 348/223.1 |
| 8,175,385 B2 | 5/2012 | Steinberg et al. | |
| 8,462,221 B2 | 6/2013 | Morales | |
| 2008/0101690 A1 | 5/2008 | Hsu et al. | |
| 2011/0122284 A1 * | 5/2011 | Lipowezki | H04N 9/735 348/223.1 |
| 2012/0262600 A1 * | 10/2012 | Velarde | H04N 5/2355 348/223.1 |
| 2013/0294689 A1 | 11/2013 | Jia et al. | |

OTHER PUBLICATIONS

Multi-illuminant color constancy for HDR images through exposure segmentation issued in Proc. SPIE 8292, Color Imaging XVII: Displaying, Processing, Hardcopy, and Applications, 829204 on Jan. 25, 2012.

* cited by examiner

*Primary Examiner* — Christopher K Peterson
(74) *Attorney, Agent, or Firm* — Volentine & Whitt, PLLC

(57) ABSTRACT

A white balancing device and a method of driving the same are provided. The white balancing device includes a map generator and an automatic white balancing (AWB) block. The map generator is configured to generate an indoor-outdoor map comparing a first image and a second image generated by performing a wide dynamic range (WDR) algorithm on the first image. The AWB block is configured to generate a first white point with respect to an outdoor region and a second white point with respect to an indoor region using the indoor-outdoor map.

20 Claims, 25 Drawing Sheets

FIG. 11

| 100 | 60 | 20 |
| 25 | 18 | 10 |
| 50 | 30 | 0 |
| 16 | 15 | 6 |
| 50 | 0 | 0 |
| 16 | 5 | 5 |

101

102

103

104

201

202

203

204

WHITE BALANCING DEVICE AND METHOD OF DRIVING THE SAME

CROSS-REFERENCE TO RELATED APPLICATION

A claim for priority under 35 U.S.C. §119 is made to Korean Patent Application No. 10-2014-0055088 filed on May 8, 2014, in the Korean Intellectual Property Office, the entire contents of which are hereby incorporated by reference.

BACKGROUND

Embodiments of the inventive concept relate to a white balancing device, and more particularly, to a white balancing device that generates an indoor-outdoor map comparing an input image and an output image generated by performing a wide dynamic range (WDR) algorithm, and generates a first white point with respect to an outdoor region and a second white point with respect to an indoor region using the indoor-outdoor map, and a method of driving the same.

A conventional wide dynamic range (WDR) device may use a global automatic white balancing (AWB) method. Thus, color casting problems occur due to compensating a white balance as a global gain, even when light sources of indoor and outdoor regions are different from each other.

To solve this problem, a method of applying a white balance gain value by dividing indoor and outdoor regions from an image is proposed. However, to divide indoor and outdoor regions from the image, a frame memory is required. Further, due to use of a saturated pixel of a long or short exposure image from the pixel, a division of an indoor-outdoor region becomes inaccurate, a problem arises in that an unnatural boundary aspect between an indoor and outdoor region may occur.

SUMMARY

Embodiments of the inventive concept provide a white balancing (WB) device capable of performing a WB operation with respect to different regions, such as indoor and outdoor regions, even when light sources of the regions are different. Other embodiments of the inventive concept provide a method of driving the WB device. Still other embodiments of the inventive concept provide an image signal processor including the WB device.

The technical objectives of the inventive concept are not limited to the disclosure, and other objectives may become apparent to those of ordinary skill in the art based on the following descriptions.

In accordance with an aspect of the inventive concept, a white balancing device includes a map generator and an automatic white balancing (AWB) block. The map generator is configured to generate an indoor-outdoor map comparing a first image and a second image generated by performing a wide dynamic range (WDR) algorithm on the first image. The AWB block is configured to generate a first white point with respect to an outdoor region and a second white point with respect to an indoor region using the indoor-outdoor map.

The white balancing device may further include a white balancing unit configured to calculate a weight value of each pixel of multiple pixels in a boundary region between the indoor region and the outdoor region using the indoor-outdoor map, and to generate a third white point corresponding to a pixel in the boundary region using the first and second white points and the calculated weight value corresponding to the pixel. The white balancing unit may perform a white balancing operation with respect to pixels in the outdoor region using the first white point, perform the white balancing operation with respect to pixels in the indoor region using the second white point, and perform the white balancing operation with respect to the pixel in the boundary region using the third white point.

The third white point may include a gain value with respect to a red (R) pixel, a green (G) pixel, and a blue (B) pixel, which are in the boundary region. The first white point may include a gain value with respect to an R pixel, a G pixel, and a B pixel, which are in the outdoor region, and the second white point includes a gain value with respect to an R pixel, a G pixel, and a B pixel, which are in the indoor region.

The WDR algorithm may include applying a long integration time with respect to pixels in the indoor region and applying a short integration time with respect to pixels in the outdoor region.

The white balancing device may further include a patch generator configured to classify pixels in the second image in units of patches, to calculate an average illuminance value and a weight value with respect to each patch using the indoor-outdoor map, and to transmit the calculated result to the AWB block. The AWB block may generate the first and second white points using the average illuminance value and the weight value.

The indoor-outdoor map may include information about a boundary region between the indoor region and the outdoor region.

The white balancing device may further include a WDR block configured to perform the WDR algorithm with respect to the first image to generate the second image.

In accordance with another aspect of the inventive concept, a method of driving a white balancing device is provided. The method includes performing a WDR algorithm on a first image to generate a second image, comparing the first image and second image to generate an indoor-outdoor map, and generating a first white point with respect to an outdoor region and a second white point with respect to an indoor region using the indoor-outdoor map.

The method may further include calculating a weight value of each pixel of a plurality of pixels in a boundary region between the indoor region and the outdoor region using the indoor-outdoor map, and generating white points corresponding to the pixels in the boundary region using the first and second with points and the calculated weight values.

The method may further include performing a white balancing operation with respect to pixels in the outdoor region using the first white point, performing the white balancing operation with respect to pixels in the indoor region using the second white point, and performing the white balancing operation with respect to the pixels in the boundary region using the generated plurality of white points.

The first white point may include a gain value with respect to a red (R) pixel, a green (G) pixel, and a blue (B) pixel, which are in the outdoor region, the second white point may include a gain value with respect to an R pixel, a G pixel, and a B pixel, which are in the indoor region, and each of the generated white points may include a gain value with respect to an R pixel, a G pixel, and a B pixel, which are in the boundary region.

Generating the second image by performing the WDR algorithm on the first image may include applying a long integration time with respect to pixels in the indoor region, and applying a short integration time with respect to pixels in the outdoor region.

In accordance with another aspect of the inventive concept, a white balancing device includes a WDR block, a map generator and an AWB block. The WDR block is configured to receive a first image, and to perform a WDR algorithm on the first image to generate a second image. The map generator is configured to generate a map comparing the first and second image. The AWB block is configured to generate a first white point with respect to a first region illuminated by a first light source and a second white point with respect to a second region illuminated by a second light source different from the first light source.

The white balancing device may further include a white balancing unit configured to calculate weight values of pixels in a boundary region between the first region and the second region using the map, and to generate white points corresponding to the pixels in the boundary region using the first and second white points and the calculated weight values. The white balancing unit may be further configured to perform a white balancing operation with respect to pixels in the first region using the first white point, to perform the white balancing operation with respect to pixels in the second region using the second white point, and to perform the white balancing operation with respect to the pixels in the boundary region using the corresponding generated white points.

The first region may be an outdoor region and the second region may be an indoor region.

In accordance with another aspect of the inventive concept, an image signal processor includes an input unit configured to receive image data from an image sensor, a reconstruction unit configured to reconstruct bits of the image data received from the input unit to provide reconstructed image data, and the white balancing device described above. The white balancing device is configured to receive the reconstructed image data as the first image and to output white balanced image data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the inventive concept will be more clearly understood from the following description taken in conjunction with the accompanying drawings, in which like reference characters refer to the same parts throughout the different views. The drawings are not necessarily to scale, emphasis instead being placed upon illustrating the principles of the inventive concepts. In the drawings:

FIG. 11 illustrates the patch generator shown in FIG. 10, according to an embodiment of the inventive concept;

DETAILED DESCRIPTION OF THE EMBODIMENTS

Figure 1:
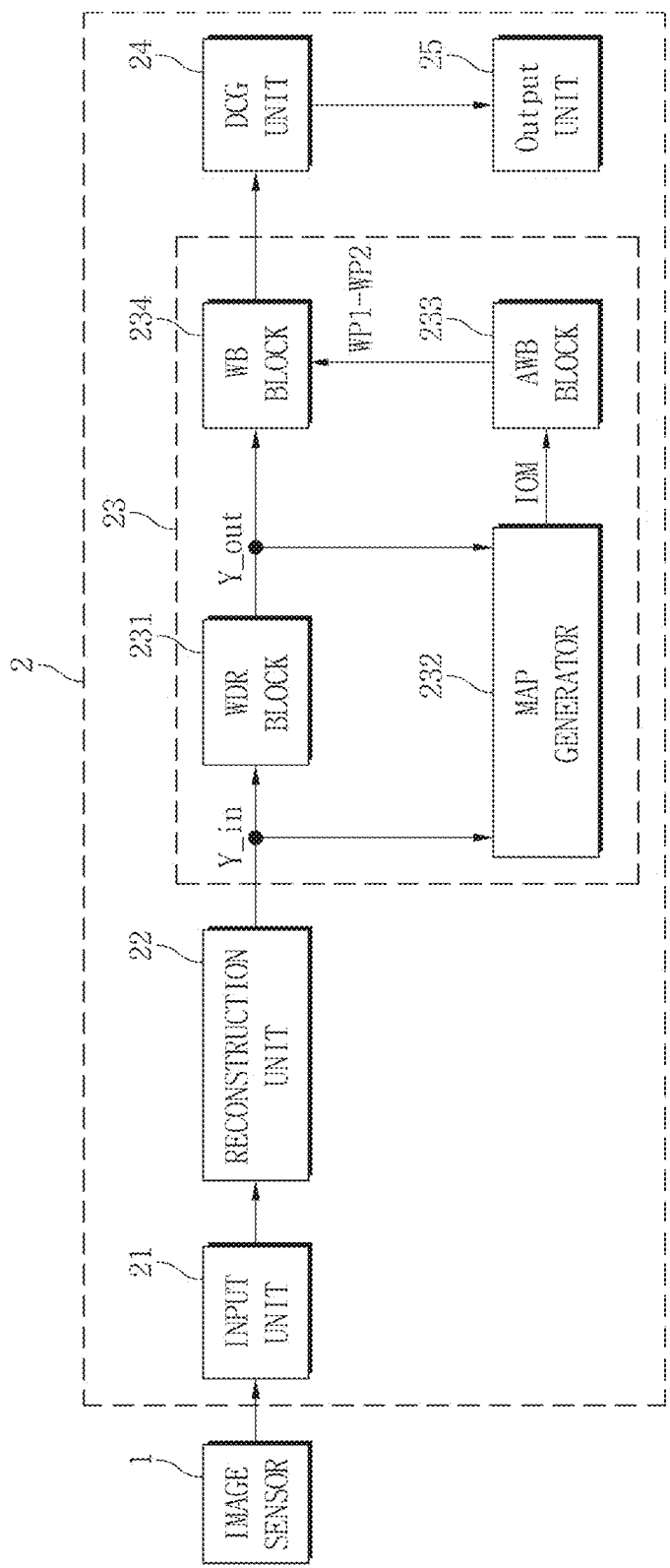
FIG. 1 is a block diagram illustrating a white balancing (WB) device according to an embodiment of the inventive concept.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may not be repeated. In the drawings, sizes and relative sizes of layers and regions may be exaggerated for clarity.

It will be understood that, although the terms "first," "second," "A," "B," etc., may be used herein in reference to various elements, such elements should not be construed as being limited by these terms. For example, a first element could be termed a second element, and a second element could be termed a first element, without departing from the scope of the present teachings. Herein, the term "and/or"

includes any and all combinations of one or more referents. The term "exemplary" is intended to refer to an example or illustration.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening element(s). Other words used to describe relationships between elements should be interpreted in a like fashion (i.e., "between" versus "directly between," "adjacent" versus "directly adjacent," etc.).

The terminology used herein to describe embodiments of the inventive concept is not intended to limit the scope of the invention. The articles "a," "an," and "the" are singular in that they have a single referent, however the use of the singular form in the present document should not preclude the presence of more than one referent. In other words, elements referred to as in singular may number one or more, unless the context indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Meanwhile, when it is possible to implement an embodiment in any other way, a function or an operation specified in a specific block may be performed differently from the flow specified in a corresponding flowchart. For example, the corresponding functions or operations of two consecutive blocks may actually be performed simultaneously, or the corresponding functions or operations may be performed conversely according to a related operation or function.

Embodiments of the present inventive concept will be described below with reference to the attached drawings.

FIG. 1 is a block diagram illustrating a white balancing (WB) device, according to an embodiment of the inventive concept.

Referring to FIG. 1, an image sensor 1, such as a contact image sensors (CIS), for example, is configured to capture an original image from an object (not shown). The image sensor 1 generates image data using the captured original image. For example, the image sensor 1 may generate image data of 10 bits according to a long integration time and image data of 10 bits according to a short integration time in order to perform a white dynamic range (WDR) algorithm, discussed below. The image sensor 1 is described further with reference to FIGS. 4A and 4B, below.

The image sensor 1 transmits the image data of 10 bits according to the long integration time and the image data of 10 bits according to the short integration time to an image signal processor 2. The image signal processor 2 performs the WDR algorithm or a WB operation with respect to the received image data (i.e., the image data of 10 bits according to the long integration time and the image data of 10 bits according to the short integration time).

In an embodiment, the image signal processor 2 may be fabricated as one independent chip. Further, the image signal processor 2 may be embodied in a functional block in an application processor. Further, the image signal processor 2 may be included in the image sensor 1.

The image signal processor 2 includes an input unit 21, a reconstruction unit 22, a WB device 23, a demosaicing CCM gamma (DCG) unit 24, and an output unit 25.

The input unit 21 receives the image data from the image sensor 1. The input unit 21 transmits the image data of 10 bits according to the long integration time and the image data of 10 bits according to the short integration time to the reconstruction unit 22. The reconstruction unit 22 reconstructs the image data of 10 bits according to the long integration time and the image data of 10 bits according to the short integration time as image data of 14 bits, for example.

The WB device 23 is configured to control proper white balance in the original image when there are different light sources in the original image. For example, when photographing an outdoor object from an interior room, both indoor and outdoor scenes in the original image may be captured. Therefore, both natural light and ambient light generated by the natural light may be in an outdoor region, which may be considered one light source. In contrast, indoor lighting may be in an indoor region, which may be considered another light source. An illustrative method of driving the WB device 23 is described with reference to FIGS. 5A to 8, below.

When performing the WDR algorithm due to different light sources in the original image, a global automatic WB (AWB) value for performing a WB operation may be used. Thus, a color casting problem may occur, in that the color perceived in the image by a human is not the same color according to a light source. That is, humans have the ability to perceive the same color regardless of the type of light source. These characteristics are referred to as color adaption or color constancy. When a color casting problem occurs, color discordance between the color of the real object and the color of an image of the object may occur.

To solve this problem, the WB device 23 according to the embodiment of inventive concept generates an AWB value according to each of the different light sources, and applies the AWB value to an image to which the WDR algorithm is applied. More particularly, the WB device 23 generates a first AWB value, e.g., corresponding to an outdoor region, and a second AWB value, e.g., corresponding to an indoor region, and applies the first and second AWB values to RGB pixels in the image to which the WDR algorithm is applied.

In the depicted embodiment, the WB device 23 includes a WDR block 231, a map generator 232, an AWB block 233, and a WB unit 234. The WDR block 231 may include a dynamic range compression (DRC) block, for example, to apply a WDR algorithm. The WDR block 231 is configured to receive a first image Y_in from the reconstruction unit 22 and to perform the WDR algorithm with respect to the first image Y_in to generate a second image Y_out. The WDR algorithm may be referred to as a high dynamic range (HDR) algorithm. An illustrative method of performing the WDR algorithm is described with reference to FIGS. 2A to 3B, below.

The map generator 232 receives the first image Y_in and the second image Y_out. The map generator 232 generates an indoor-outdoor map IOM using the first image Y_in and the second image Y_out. For example, the map generator 232 may generate the indoor-outdoor map IOM by dividing a value of the second image Y_out by a value the first image Y_in. An illustrative method of generating the indoor-outdoor map IOM is described with reference to FIGS. 5A to 5C, below.

The AWB block 233 is configured to calculate white points using the indoor-outdoor map IOM. The white points provide information regarding the light sources. Each white point includes color temperature, ratio data regarding each RGB pixel, and a gain value with regard to each RGB pixel. The WB device 23 may perform a WB operation using the gain values with regard to the RGB pixels included in the white points.

For example, the AWB block 233 generates a first white point WP1 for an outdoor region and a second white point WP2 for an indoor region. The AWB block 233 transmits the first and second white points WP1 and WP2 to the WB unit 234. The WB unit 234 applies the gain value with respect to each of the RGB pixels included in each of the first and second white points WP1 and WP2, respectively, to the image from application of the WDR algorithm (the second image Y_out), to implement color constancy or color adaption of the human eye.

The DCG unit 24 is configured to perform post-image-processing with regard to image data to which the WDR algorithm was applied and/or the WB was applied. For example, the DCG unit 24 may perform a demosaicing algorithm, perform a color correction matrix (CCM) method, or adjust a gamma value. The demosaicing algorithm adjusts RGB pixel data based on color. The CCM method adjusts sensitivity with regard to each of the RGB pixels. The gamma value adjusts RGB pixel data based on brightness.

The output unit 25 is configured to output the processed image data to a display device or a memory device, for example.

Figure 2A:
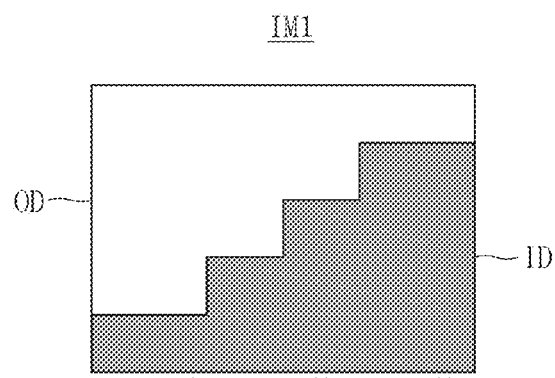
FIGS. 2A to 2C are conceptual diagrams for describing an operation of the WDR block, according to an embodiment of the inventive concept.
Figure 2B:
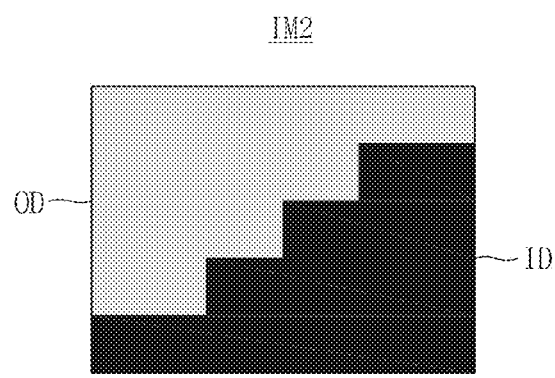
Figure 2C:
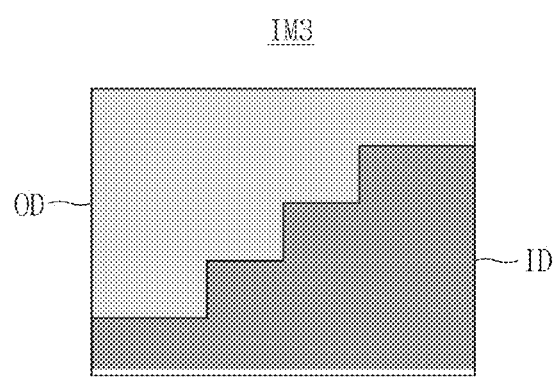

FIGS. 2A to 2C are conceptual diagrams for describing an operation of the WDR block, according to an embodiment of the inventive concept.

Referring to FIGS. 1 and 2A, when photographing toward an outdoor object from indoors, the first image IM1 may include both an indoor image and an outdoor image. Here, when focusing an indoor region ID, an outdoor region OD may appear bluish white and the indoor region ID may have a proper illuminance.

Referring to FIGS. 1 and 2B, the second image IM2 includes both an indoor image and an outdoor image. Here, when focusing the outdoor region ID, an indoor region ID may appear reddish black and the outdoor region OD may have a proper illuminance.

Referring to FIGS. 1 and 2C, the process of applying a WDR algorithm provides a third image IM3 by combining the indoor region ID of the first image IM1 and the outdoor region OD of the second image IM2. More particularly, the third image IM3, to which the WDR algorithm is applied, may include the indoor region ID of the first image IM1 and the outdoor region OD of the second image IM2. That is, applying the WDR algorithm results in a single image that has a proper illuminance in the indoor region ID and the outdoor region OD by combining two images having different integration times.

Figure 3A:
FIGS. 3A and 3B are images for comparing before and after applying a WDR algorithm, according to an embodiment of the inventive concept.
Figure 3B:

FIGS. 3A and 3B are images for comparing before and after application of a WDR algorithm, according to an embodiment of the inventive concept.

Referring to FIG. 3A, the first image 31 is an image before applying the WDR algorithm. As shown, the shaded region the first image 31 is very dark and the sunny region the first image 31 has proper luminance. Referring to FIG. 3B, the second image 32 is an image after applying the WDR algorithm. In the second image, luminance corresponding to the shaded region has been corrected, such that both the shaded region and the sunny region have proper luminance.

Figures 4A, 4B:
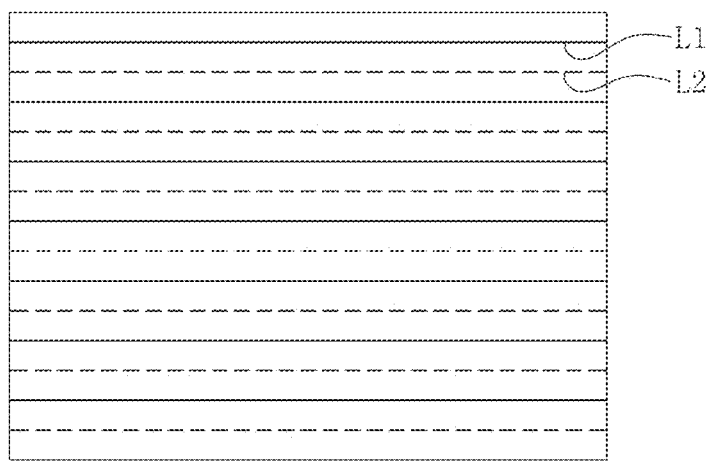
FIGS. 4A and 4B are conceptual diagrams for describing a method of driving the image sensor shown in FIG. 1, according to an embodiment of the inventive concept.

FIGS. 4A and 4B are conceptual diagrams for describing a method of driving the image sensor shown in FIG. 1, according to an embodiment of the inventive concept.

Referring to FIGS. 1 and 4A, the image sensor 1 has a plurality of lines, such that the image sensor 1 includes odd-numbered lines and even-numbered lines. For example, the first line L1 is an odd-numbered line and the second line L2 is an even-numbered line.

Each of the lines may have different integration time. For example, the first line L1 may have a long integration time and the second line L2 may have short integration time (e.g., relative to the long integration time of the first line L1). In an embodiment, all of the odd-numbered lines have long integration times and all of the even-numbered lines have short integration times.

Referring to FIGS. 1 and 4B, the image sensor 1 may have a plurality of pixels. The pixels each may receive an image signal from an object. To perform a WDR algorithm, the pixels each may be designed to have a long or short integration time. For example, the first pixel P1 has a long integration time (indicated by "L") and the second pixel P2 has a short integration time (indicated by "S") (e.g., relative to the long integration time). Likewise, the third pixel P3 has a long integration time and the fourth pixel P4 has a short integration time. In an embodiment, the WDR algorithm may include applying long integration times with respect to pixels in the indoor region and applying short integration times with respect to pixels in the outdoor region.

Figure 5A:
FIGS. 5A to 5C are images describing an operation of the map generator shown in FIG. 1, according to an embodiment of the inventive concept.
Figure 5B:
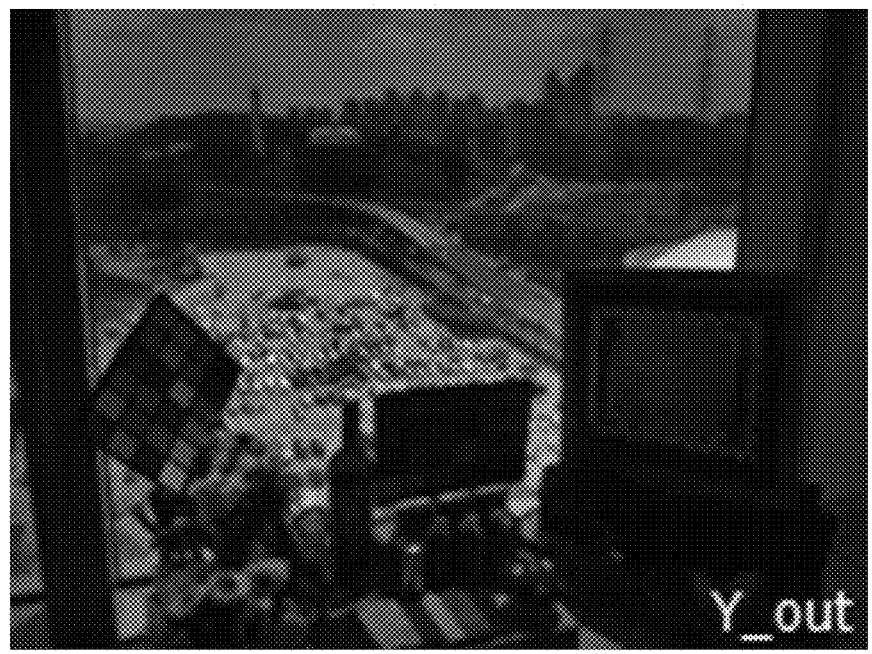
Figure 5C:
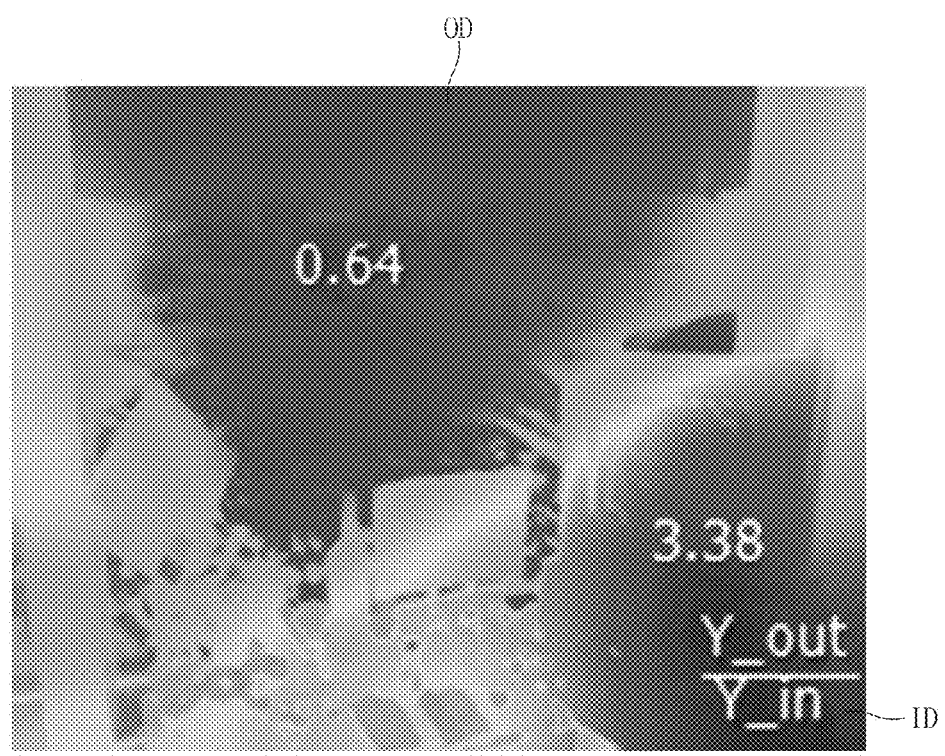

FIGS. 5A to 5C are images for describing an operation of the map generator shown in FIG. 1, according to an embodiment of the inventive concept.

Referring to FIGS. 1 and 5A, the image sensor 1 generates the first image Y_in. The WDR block 231 and the map generator 232 receive the first image Y_in. Referring to FIGS. 1 and 5B, the WDR block 231 performs a WDR algorithm with respect to the first image Y_in and generates the second image Y_out. The WDR block 231 transmits the second image Y_out to the map generator 232.

Referring to FIGS. 1 and 5C, the map generator 232 receives the first image Y_in and the second image Y_out. The map generator 232 divides a value of the second image Y_out by a value of the first image Y_in, and generates an indoor-outdoor map IOM. More particularly, each of the first image Y_in and the second image Y_out includes an illuminance value for each of a corresponding plurality of pixels, respectively. The map generator 232 divides the illuminance value of a pixel in the second image Y_out by an illuminance value of a pixel, which is located in the same position, in the first image Y_in.

The indoor-outdoor map IOM may include illuminance ratio information regarding each of the pixels. For example, an illuminance difference among pixels in the outdoor region may be relatively small. Accordingly, the illuminance ratio value of the outdoor region may have a low value. In the depicted illustration, the illuminance ratio value of the outdoor region is 0.64, for example. Further, an illuminance difference among pixels in the indoor region may be relatively large. Accordingly, the illuminance ratio value of the indoor region may have a high value. In the depicted illustration, the illuminance ratio value of the indoor region is 3.38, for example.

Figure 6:
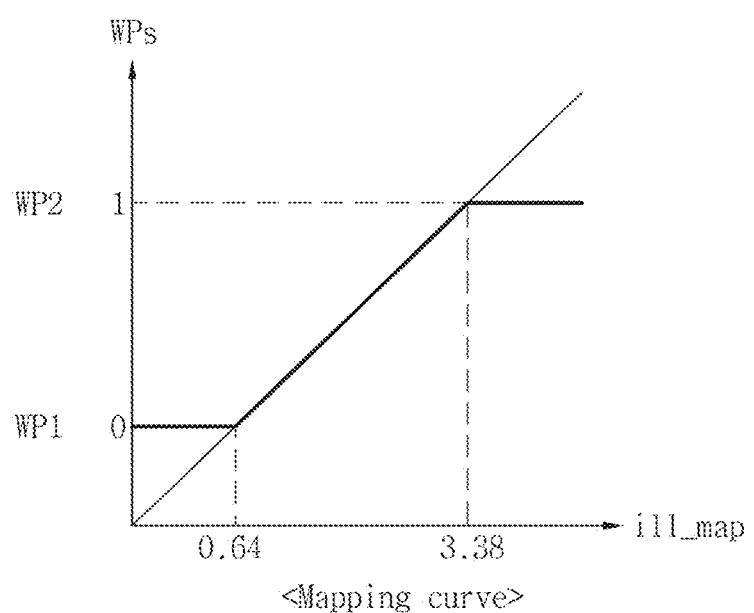
FIG. 6 is a graph illustrating first and second white points shown in FIG. 1, according to an embodiment of the inventive concept.

FIG. 6 is a graph illustrating the first and second white points shown in FIG. 1, according to an embodiment of the inventive concept.

Referring to FIGS. 1 and 6, the abscissa denotes the illumination ratio values (obtained by dividing the value of the second image Y_out by the value of the first image Y_in). The ordinate denotes white points. The WB device 23 corrects values less than the value of the first white point WP1 (e.g., 0.64) to be 0.64. Further, the WB device 23 corrects values greater than the value of the second white point WP2 (e.g., 3.38) to be 3.38.

The AWB block 233 may normalize the illumination ratio values (e.g., between 0.64 and 3.38) to a range of 0 to 1. Accordingly, the AWB block 233 may set a weight value with respect to the outdoor region as 0 and a weight value with respect to the indoor region as 1.

Figure 7:
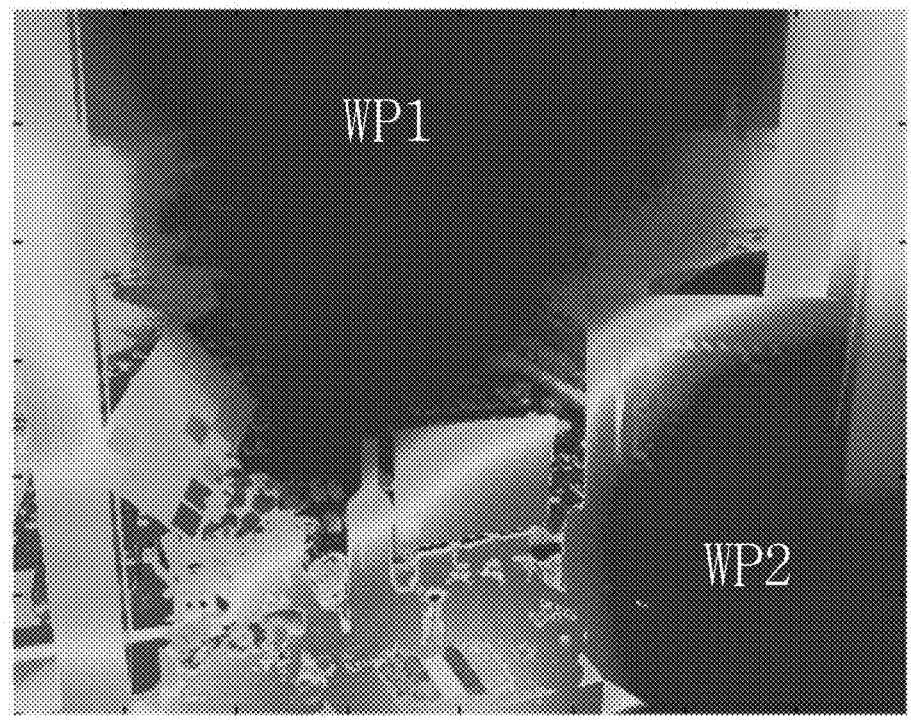
FIG. 7 illustrates the first and second white points shown in FIG. 6, according to an embodiment of the inventive concept.

FIG. 7 illustrates the first and second white points shown in FIG. 6, according to an embodiment of the inventive concept.

Referring to FIG. 7, an image shows a normalized illuminant map. The first white point WP1 corresponds to the outdoor region, and the second white point WP2 corresponds to the indoor region.

The first white point WP1 includes a gain value with respect to each of a red (R) pixel, a green (G) pixel, and a blue (B) pixel, which are included in the outdoor region. For example, the first white point WP1 may have 1.37 as the gain value with respect to the R pixel, 1.00 as the gain value with respect to the G pixel, and 1.47 as the gain value with respect to the B pixel. Similarly, the second white point WP2 includes a gain value with respect to each of an R pixel, a G pixel, and a B pixel, which are included in the indoor region. For example, the second white point WP2 may have 1.22 as the gain value with respect to the R pixel, 1.00 as the gain value with respect to the G pixel, and 1.44 as the gain value with respect to the B pixel.

Figure 8:
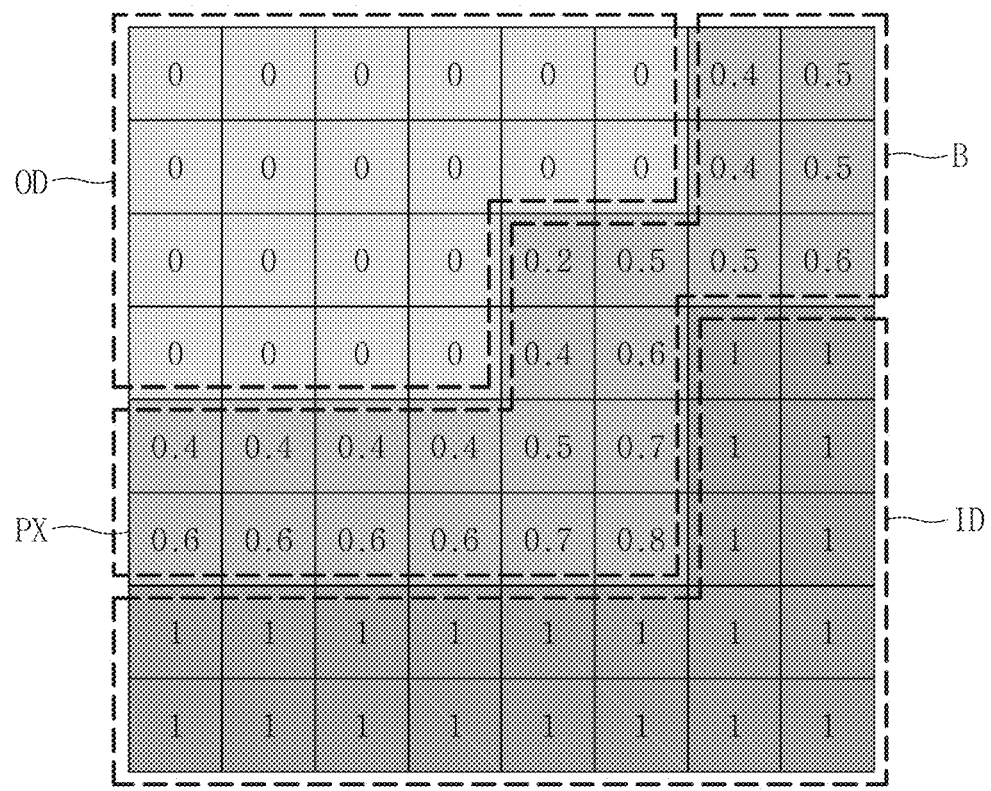
FIG. 8 is a conceptual diagram for describing a driving method of the WB device shown in FIG. 1, according to an embodiment of the inventive concept.

FIG. 8 is a conceptual diagram for describing a driving method of the WB unit shown in FIG. 1, according to an embodiment of the inventive concept.

Referring to FIGS. 1 and 8, each block of FIG. 8 represents a pixel. Each of the pixels included in the indoor region ID is designed to have a weight value of 1. Each of the pixels included in the outdoor region OD is designed to have a weight value of 0. Each of the pixels included in a boundary region B, which is between the indoor region ID and the outdoor region OD, has a weight value between 0 and 1.

The weight value with respect to the pixels in the boundary region B may be calculated using the indoor-outdoor map IOM. For example, a pixel in the boundary region B that is adjacent to a pixel in the indoor region ID may have a weight value close to 1. In contrast, a pixel in the boundary region B that is adjacent to a pixel in the outdoor region OD may have a weight value close to 0.

The WB device 23 applies the first white point WP1 to the pixels in the outdoor region OD and the second white point WP2 to the pixels in the indoor region ID. Further, the WB device 23 may calculate white points (e.g., at least a third white point) with respect to the pixels in the boundary region B by multiplying the corresponding weight values by each of the first and second white points WP1 and WP2. For example, a third white point with respect to a certain pixel PX in the boundary region B may be calculated as (WP1*0.4+WP2*0.6).

Figure 9:
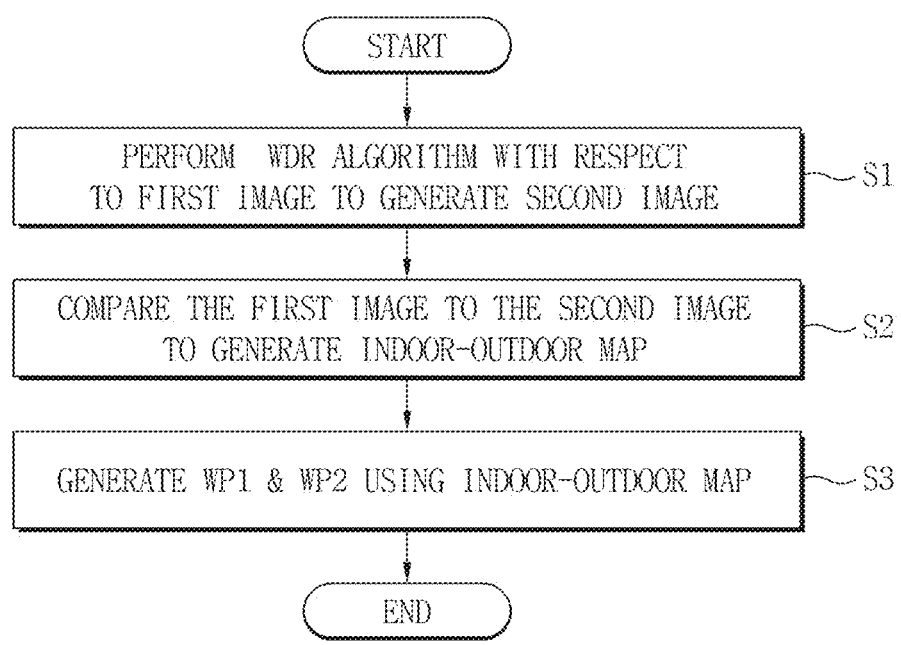
FIG. 9 is a flow chart illustrating a driving method of the WB device shown in FIG. 1, according to an embodiment of the inventive concept.

FIG. 9 is a flow chart illustrating a driving method of the WB device shown in FIG. 1.

Referring to FIGS. 1 and 9, in block S1, the WB device 23 performs a WDR algorithm with respect to the first image Y_in and generates the second image Y_out. In block S2, the WB device 23 compares the first image Y_in and the second image Y_out and generates an indoor-outdoor map IOM based on the comparison. In block S3, the WB device 23 generates a first white point WP1 for a WB operation of the indoor region and a second white point WP2 for a WB operation of the outdoor region using the indoor-outdoor map IOM. Further, the WB device 23 may generate white points with respect to pixels in a boundary region between the pixels in the indoor region and pixels in the outdoor region by multiplying a weight value by each of the first and second white points WP1 and WP2.

Figure 10:
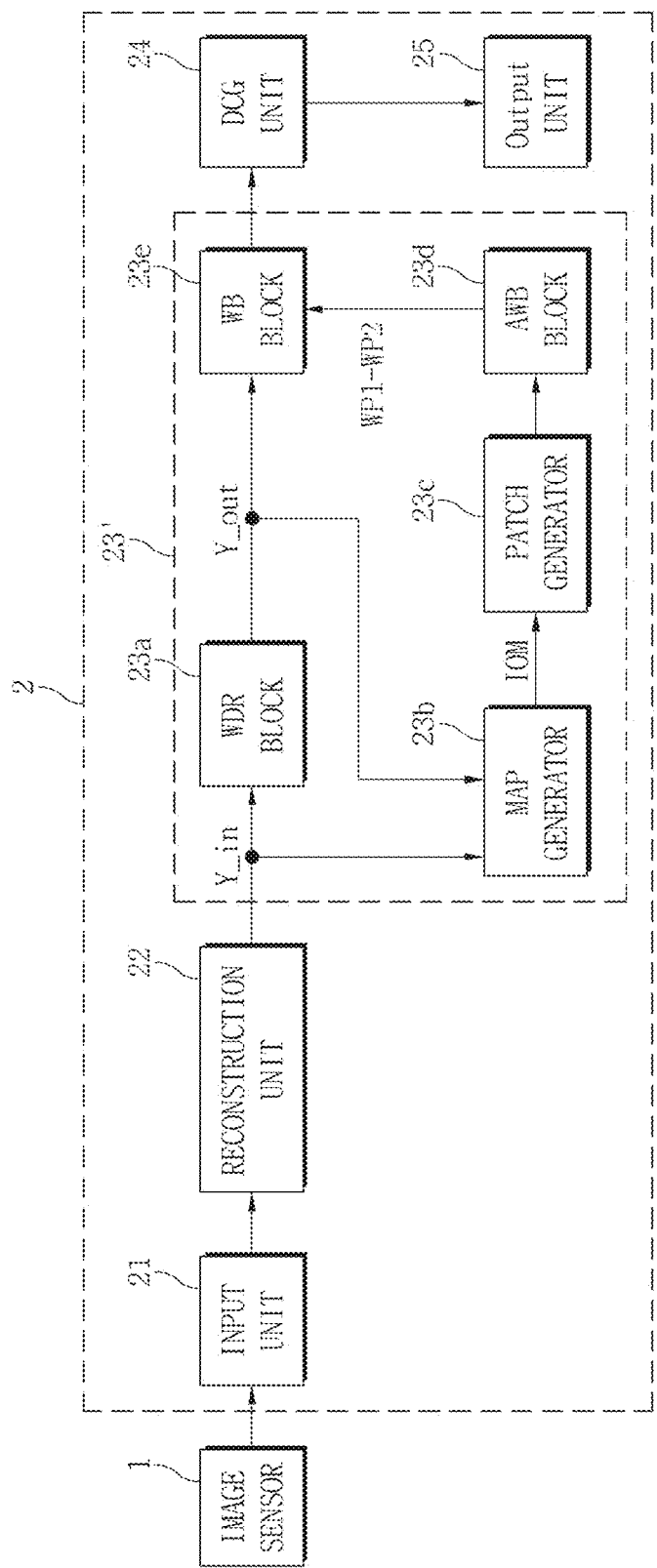
FIG. 10 is a block diagram illustrating the WB device according to another embodiment of the inventive concept.

FIG. 10 is a block diagram illustrating the WB device, according to another embodiment of the inventive concept.

WB device 23' shown in FIG. 10 may have substantially the same configuration as the WB device 23 shown in FIG. 1 except for the addition of a patch generator 23c. Accordingly, for convenience of explanation, detailed descriptions of the map generator, the AWB block and the WB unit will not be repeated.

Referring to FIG. 10, the WB device 23' includes a WDR block 23a, a map generator 23b, an AWB block 23d and a WB block 23e, which are substantially the same as the WDR block 231, the map generator 232, the AWB block 233 and the WB block 234, discussed above with reference to FIG. 1. In addition, the WB device 23' includes a patch generator 23c.

The WDR block 23a receives the first image Y_in from the reconstruction unit 22, and applies the WDR algorithm to the first image Y_in to generate the second image Y_out. The map generator 23b receives the first image Y_in and the second image Y_out, and generates an indoor-outdoor map IOM using the first image Y_in and the second image Y_out. For example, the map generator 23b may generate the indoor-outdoor map IOM by dividing a value of the second image Y_out by a value of the first image Y_in.

A bundle of pixels having a predetermined size, with respect to pixels in an original image, is referred to as a patch or statistics. To reduce the amount of calculations with respect to a WB operation, the patch generator 23c is configured to transmit information about an average brightness and a weight value according to the patch to the AWB block 23d. An operation of the patch generator 23c is described further with reference to FIG. 11.

The AWB block 23d calculates white points using the indoor-outdoor map IOM. The AWB block 23d generates a first white point WP1 for an outdoor region and a second white point WP2 for an indoor region. The AWB block 23d transmits the first and second white points WP1 and WP2 to the WB unit 23e. The WB block 23e applies a gain value of each of an R pixel, a G pixel, and a B pixel included in each of the first and second white points WP1 and WP2, respectively, to all pixels in the original image.

Figure 11:
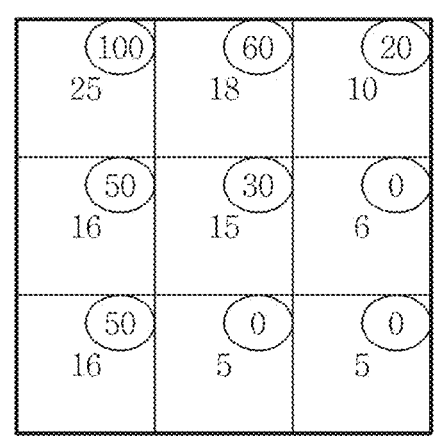

FIG. 11 illustrates the patch generator shown in FIG. 10, according to an embodiment of the inventive concept.

Referring to FIGS. 10 and 11, a bundle of pixels having an arbitrary size is referred to as a patch or statistics. The patch generator 23c classifies multiple pixels in units of patches, and calculates an average brightness value, an average RGB value, and a weight value with respect to each of the classified patches using the indoor-outdoor map IOM. The patch generator 23c transmits the average brightness value, the average RGB value, and the weight value with respect to each of the classified patches to the AWB block 23d.

The AWB block 23d generates the first white point WP1 with respect to an outdoor region and the second white point WP2 with respect to an indoor region using the average brightness and the weight value according to the patches. Referring to FIG. 11, the number in each square indicates the average brightness value of the corresponding patch and the number in each respective circle (within the square) indicates the weight value of the corresponding patch.

FIGS. 12A to 12D illustrate results according to methods of driving a WB device, including the method of driving the WB device according to an embodiment of the inventive concept. Each of FIGS. 12A to 12D displays an image having different light sources for illuminating inside and outside of a box, respectively.

Figure 12A:
FIGS. 12A to 12D illustrate image results according to methods of driving the WB device, including a method according to an embodiment of the inventive concept.

FIG. 12A displays image 101, to which a global AWB value (i.e., a white point) is applied. As a result, the inside of the box appears reddish and the outside of the box appears bluish.

Figure 12B:
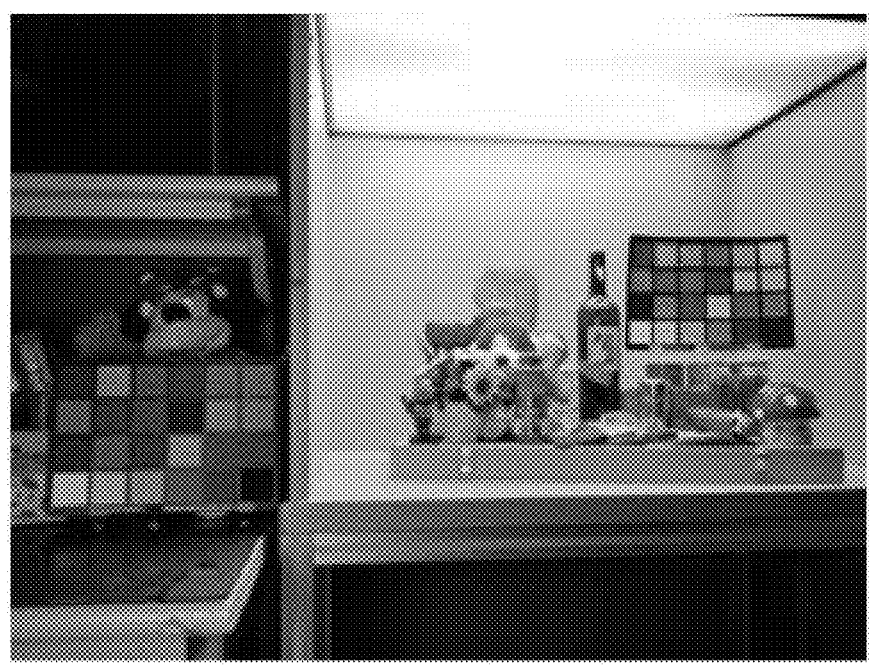

FIG. 12B displays image 102, to which a global AWB value is applied based on the outside region of the box. As a result, the inside of the box appears more reddish and the outside of the box is normally displayed.

Figure 12C:

FIG. 12C displays image 103, to which a global AWB value is applied based on the inside region of the box. As a result, the inside of a box is normally displayed and the outside of the box appears more bluish.

Figure 12D:

FIG. 12D displays image 104, to which the WB method of the WB device 23 shown in FIG. 1 is applied, according to an embodiment of the inventive concept. As a result, both the inside and the outside of the box are normally displayed. That is, the outside of the box is displayed the same as the outside of the box in image 102 shown in FIG. 12B, and the inside of the box is displayed the same as the inside of the box in image 103 shown in FIG. 12C.

Figure 13:
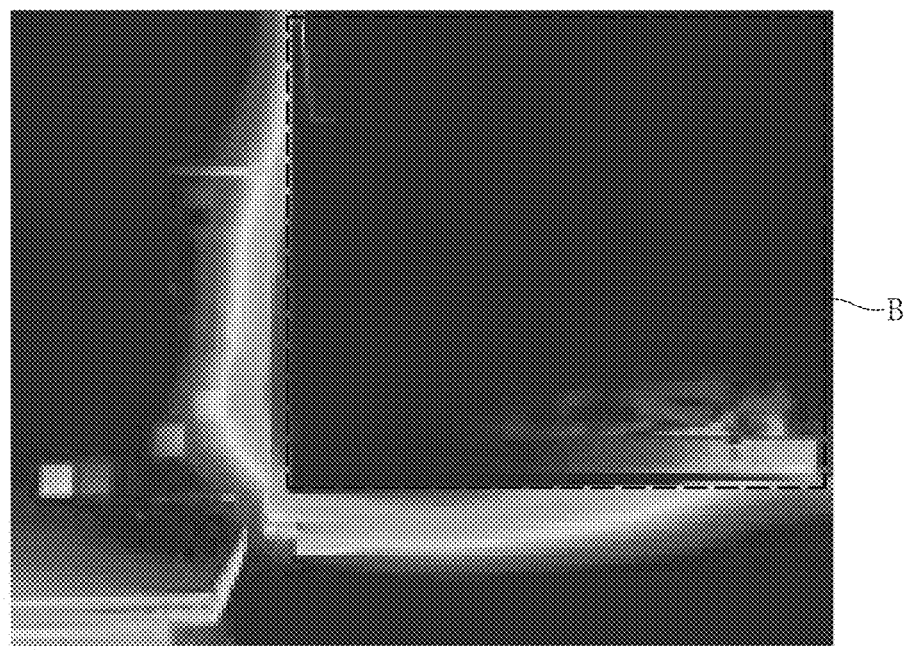
FIG. 13 illustrates an indoor-outdoor map with respect to images shown in FIGS. 12A to 12D, respectively.

FIG. 13 illustrates an indoor-outdoor map with respect to images shown in FIGS. 12A to 12D, respectively.

Referring to FIGS. 12A to 13, a region corresponding to the inside of the box (i.e., the region having a blue color) has a bright light source. A region corresponding to the outside of the box (i.e., the region having a red color) has a dark light source. Inside the box, an illuminance ratio between the indoor region and the outdoor region may be low, while outside the box, an illuminance ratio between the indoor region and the outdoor region may be high.

FIGS. 14A to 14D illustrate results according to methods of driving a WB device, including the method of driving the WB device according to an embodiment of the inventive concept. Each of FIGS. 14A to 14D displays an image having different light sources for illuminating indoor and outdoor regions, respectively.

Figure 14A:
FIGS. 14A to 14D illustrate another result by a method of driving the WB device, according to an embodiment of the inventive concept.

FIG. 14A displays image 201, to which a global AWB value is applied. As a result, the indoor region appears reddish and the outdoor region appears bluish.

Figure 14B:
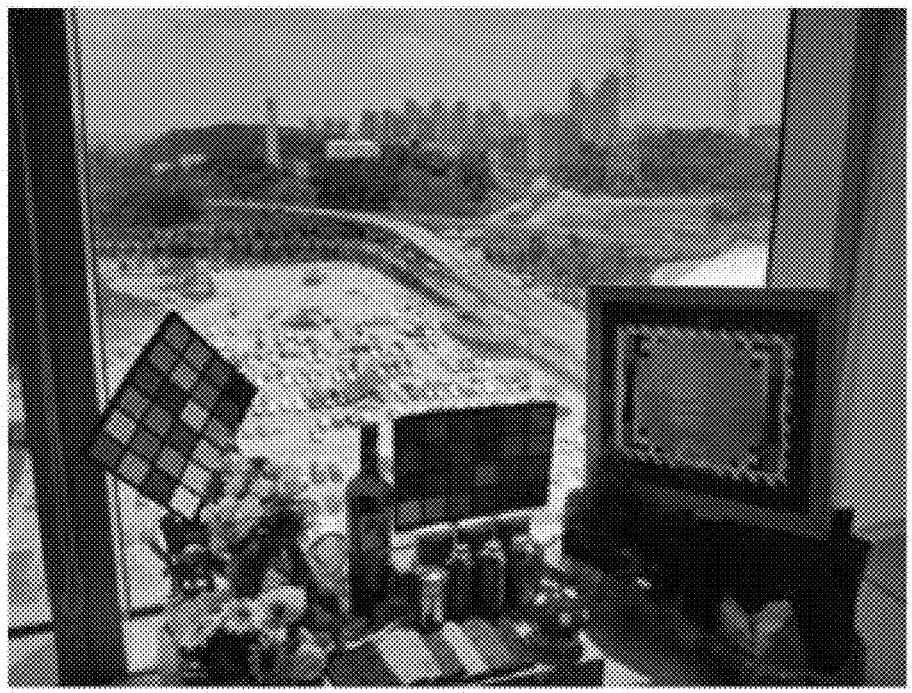

FIG. 14B displays image 202, to which a global AWB value is applied based on an outdoor region. As a result, the indoor region appears more reddish and the outdoor region is normally displayed.

Figure 14C:
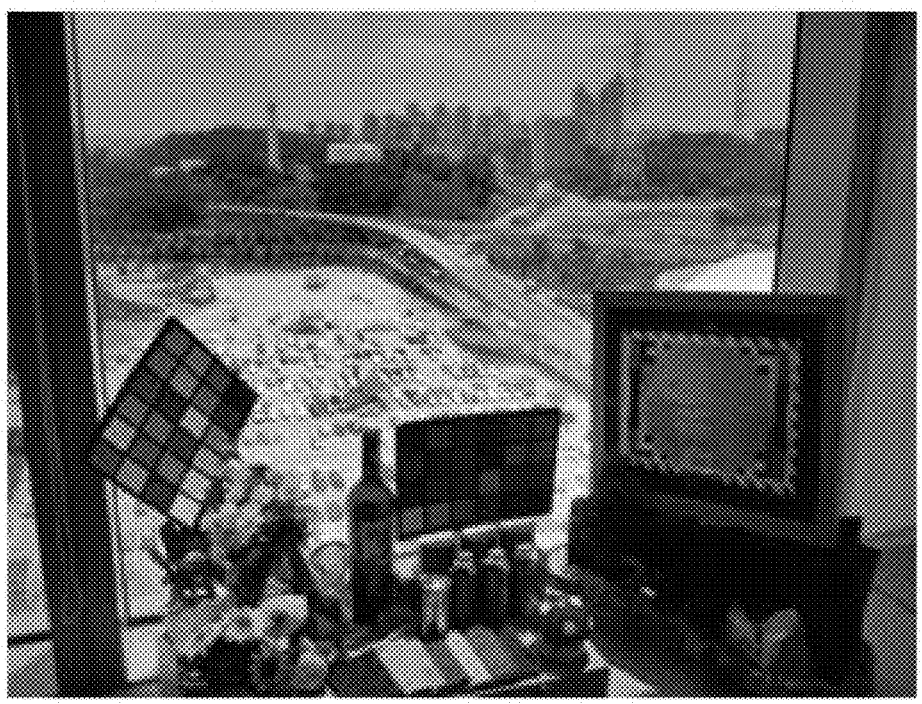

FIG. 14C displays image 203, to which a global AWB value is applied based on an indoor region. As a result, the indoor region is normally displayed and the outdoor region appears more bluish.

Figure 14D:
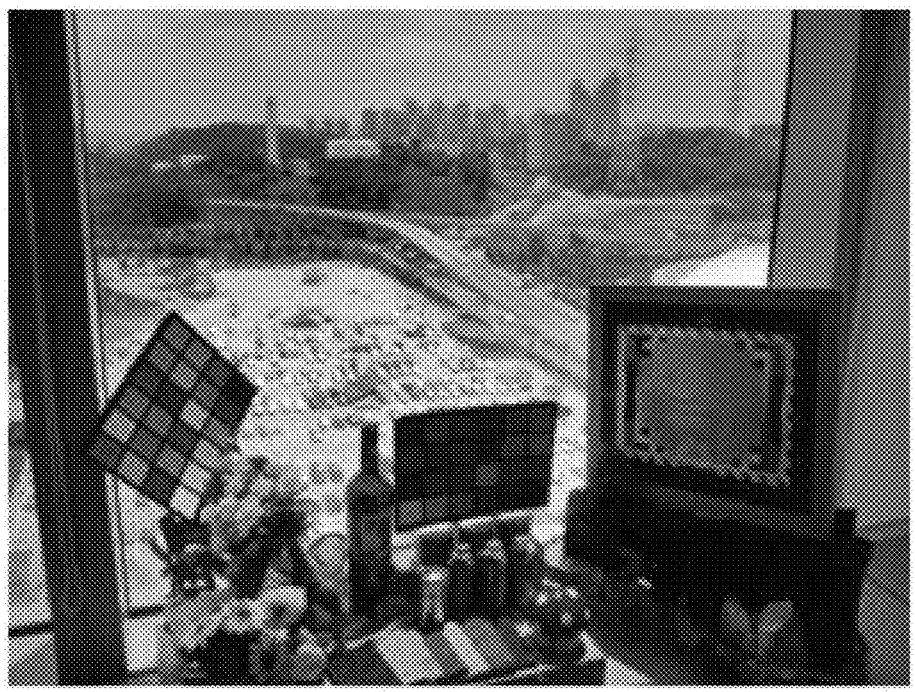

FIG. 14D displays image 204, to which the WB method of the WB device 23 shown in FIG. 1 is applied, according to an embodiment of the inventive concept. As a result, both the indoor and outdoor regions are normally displayed. That is, the outdoor region is displayed the same as the outdoor region in image 202 shown in FIG. 14B, and the indoor region is displayed the same as the indoor of image 203 shown in FIG. 14C.

Figure 15:
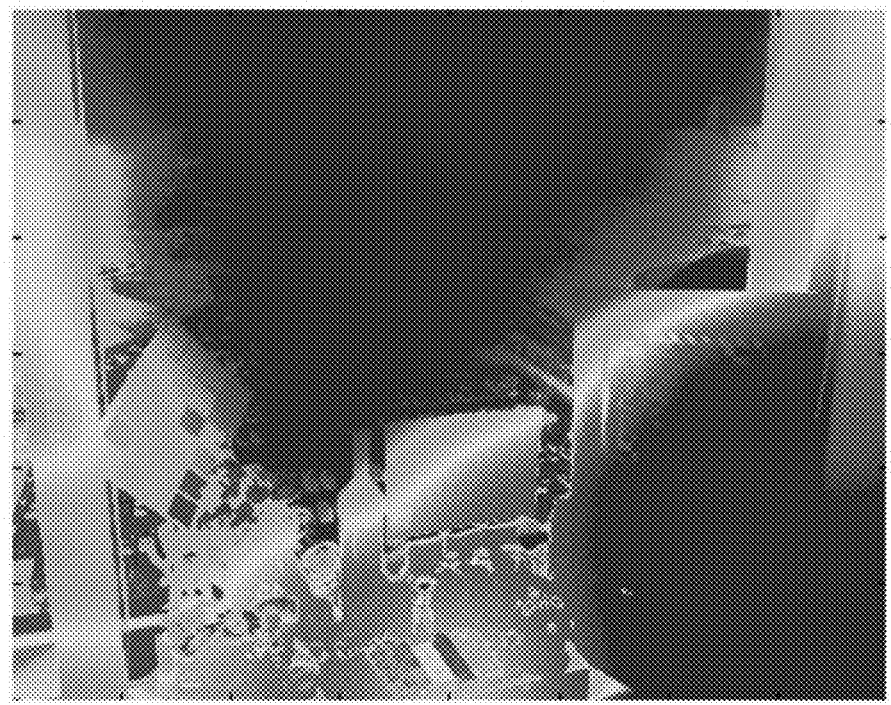
FIG. 15 illustrates an indoor-outdoor map with respect to images shown in FIGS. 14A to 14D, according to an embodiment of the inventive concept.

FIG. 15 illustrates an indoor-outdoor map with respect to images shown in FIGS. 14A to 14D.

Referring to FIGS. 14A to 15, an outdoor region (i.e., the region having a blue color) has a bright light source. An indoor region (i.e., the region having a red color) has a dark light source. In the outdoor region, an illuminance ratio between the indoor region and the outdoor region may be low, while in the indoor region, an illuminance ratio between the indoor and the outdoor region may be high.

Figure 16:
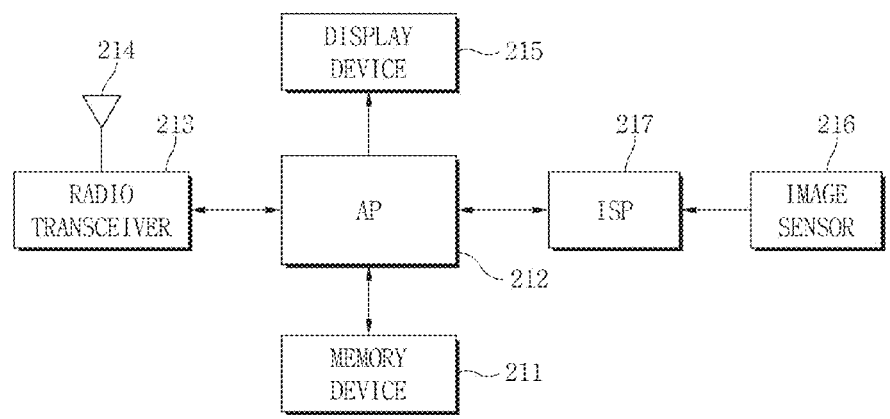
FIG. 16 is a mobile device including the WB device shown in FIG. 1, according to an embodiment of the inventive concept.

FIG. 16 is a mobile device including the WB device shown in FIG. 1, according to an embodiment of the inventive concept.

Referring to FIG. 16, a mobile device 210 may be embodied in various electronic devices, such as a smartphone, a tablet personal computer (PC), an ultra mobile personal computer (UMPC), a personal digital assistant (PDA), a portable multimedia player (PMP), an MP3 player, or an MP4 player, for example. The mobile device 210 includes a memory device 211, an application processor (AP) 212 including a memory controller for controlling the memory device 211, a radio transceiver 213, an antenna 214, and a display device 215.

The radio transceiver 213 transmits and receives radio signals through the antenna 214. For example, the radio transceiver 213 may convert a radio signal received through the antenna 214 into a signal to be processed in the AP 212. The AP 212 processes the signal output from the radio transceiver 213, and transmits the processed signal to the display device 215. Further, the radio transceiver 213 may convert a signal output from the AP 212 into a radio signal, and transmit the converted radio signal to an external device through the antenna 214.

The mobile device 210 further includes an image sensor 216 for photographing images or moving pictures, and an image signal processor (ISP) 217 for processing photographed images or moving pictures provided by the image sensor 216. In various configurations, the AP 212 may include the ISP 217.

The ISP 217 performs a WB operation with regard to an image sensed by the image sensor 216. In an embodiment, the ISP 217 includes the WB device 23 shown in FIG. 1, for example.

Figure 17:
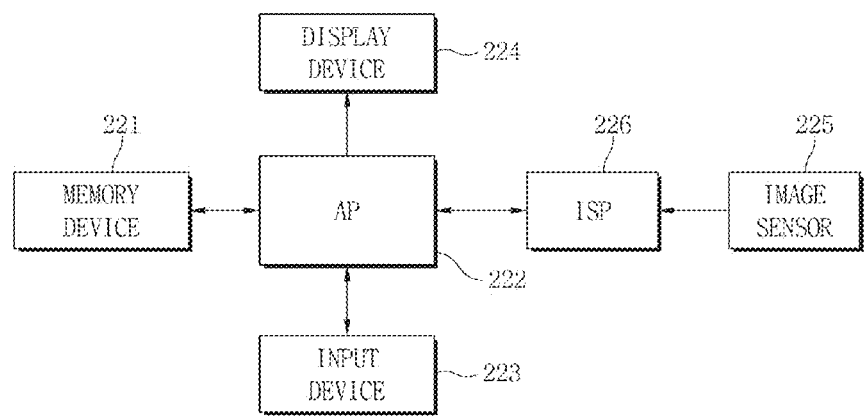
FIG. 17 is a mobile device including the WB device shown in FIG. 1, according to an embodiment of the inventive concept.

FIG. 17 is a mobile device including the WB device shown in FIG. 1, according to another embodiment of the inventive concept.

Referring to FIG. 17, a mobile device 220 may be embodied in various image processing devices, such as a digital camera, a mobile-phone on which a digital camera is attached, or a tablet, for example. The mobile device 220 includes a memory device 221, an AP 222 including a memory controller for controlling data processing operations of the memory device 221, an input device 223, and a display device 224.

The input device 223 is configured to input control signals for controlling operations of the AP 222 or data to be processed by the AP 222. The input device 223 may include in a pointing device, such as a touchpad or a computer mouse, a keypad, and/or a keyboard, for example.

The AP 222 displays data stored in the memory device 221 through the display device 224 according to data input through the input device 223. The AP 222 also controls overall operations of the mobile device 220.

The mobile device 220 further includes an image sensor 225 for photographing images or moving pictures, and an ISP 226 for processing photographed images or moving pictures provided by the image sensor 225. In various configurations, the AP 222 may include the ISP 226.

The ISP 226 performs a WB operation with regard to an image sensed by the image sensor 225. In the embodiment, the ISP 226 includes the WB device 23 shown in FIG. 1, for example.

Figure 18:
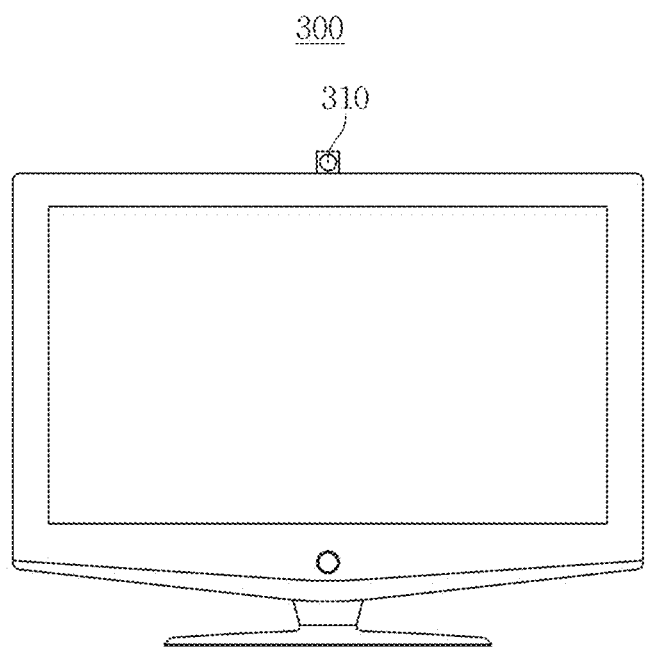
FIG. 18 is a display device 300 including the WB device shown in FIG. 1, according to an embodiment of the inventive concept.

FIG. 18 is a display device including the WB device shown in FIG. 1, according to another embodiment of the inventive concept.

Referring to FIG. 18, a display device 300 may be embodied in various display devices, such as a display device installed in a smart television (TV), a monitor, and various mobile devices, for example. The display device 300 includes a camera device 310. When the display device 300 is a smart TV, for example, various applications may be installed in the display device 300. For example, a user may perform a video call application through the camera device 310 attached to the display device 300. In the embodiment, the camera device 310 includes the WB device 23 shown in FIG. 1, for example.

A WB device according to embodiments of the inventive concept may clearly perceive a boundary region between indoor and outdoor regions, and generate an image without a color casting problem. Embodiments of the inventive concept may be applied to a WB device, an image signal processor (ISP) having the same, or a mobile device having the ISP, as discussed.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A white balancing device, comprising:
   a map generator configured to generate an indoor-outdoor map comparing a first image provided from an image sensor and a second image generated by performing a wide dynamic range (WDR) algorithm on the first image; and
   an automatic white balancing (AWB) block configured to generate a first white point with respect to an outdoor region and a second white point with respect to an indoor region using the indoor-outdoor map.

2. The device according to claim 1, further comprising:
   a white balancing unit configured to calculate a weight value of each pixel of a plurality of pixels in a boundary region between the indoor region and the outdoor region using the indoor-outdoor map, and to generate a third white point corresponding to a pixel in the boundary region using the first and second white points and the calculated weight value corresponding to the pixel.

3. The device according to claim 2, wherein the white balancing unit performs a white balancing operation with respect to pixels in the outdoor region using the first white point, performs the white balancing operation with respect to pixels in the indoor region using the second white point, and performs the white balancing operation with respect to the pixel in the boundary region using the third white point.

4. The device according to claim 2, wherein the third white point includes a gain value with respect to a red (R) pixel, a green (G) pixel, and a blue (B) pixel, which are in the boundary region.

5. The device according to claim 1, wherein the first white point includes a gain value with respect to a red (R) pixel, a green (G) pixel, and a blue (B) pixel, which are in the outdoor region, and the second white point includes a gain value with respect to an R pixel, a G pixel, and a B pixel, which are in the indoor region.

6. The device according to claim 1, wherein the WDR algorithm includes applying a long integration time with respect to pixels in the indoor region and applying a short integration time with respect to pixels in the outdoor region.

7. The device according to claim 1, further comprising:
   a patch generator configured to classify pixels in the second image in units of patches, to calculate an average illuminance value and a weight value with respect to each patch using the indoor-outdoor map, and to transmit the calculated result to the AWB block.

8. The device according to claim 7, wherein the AWB block generates the first and second white points using the average illuminance value and the weight value.

9. The device according to claim 1, wherein the indoor-outdoor map includes information about a boundary region between the indoor region and the outdoor region.

10. The device according to claim 1, further comprising:
    a WDR block configured to perform the WDR algorithm with respect to the first image to generate the second image.

11. A method of driving a white balancing device, comprising:
    receiving a first image;
    performing a wide dynamic range (WDR) algorithm on the first image to generate a second image;
    comparing the first image and the second image to generate an indoor-outdoor map; and
    generating a first white point with respect to an outdoor region and a second white point with respect to an indoor region using the indoor-outdoor map.

12. The method according to claim 11, further comprising:
    calculating a weight value of each pixel of a plurality of pixels in a boundary region between the indoor region and the outdoor region using the indoor-outdoor map; and
    generating a plurality of white points corresponding to the plurality of pixels in the boundary region using the first and second white points and the calculated weight values.

13. The method according to claim 12, further comprising:
    performing a white balancing operation with respect to pixels in the outdoor region using the first white point;
    performing the white balancing operation with respect to pixels in the indoor region using the second white point; and
    performing the white balancing operation with respect to the pixels in the boundary region using the generated plurality of white points.

14. The method according to claim 12, wherein the first white point includes a gain value with respect to a red (R) pixel, a green (G) pixel, and a blue (B) pixel, which are in the outdoor region, the second white point includes a gain value with respect to an R pixel, a G pixel, and a B pixel, which are in the indoor region, and each of the generated plurality of white points includes a gain value with respect to an R pixel, a G pixel, and a B pixel, which are in the boundary region.

15. The method according to claim 11, wherein generating the second image by performing the WDR algorithm on the first image comprises:
    applying a long integration time with respect to pixels in the indoor region; and
    applying a short integration time with respect to pixels in the outdoor region.

16. A white balancing device, comprising:
- a write dynamic range (WDR) block configured to receive a first image, and to perform a WDR algorithm on the first image to generate a second image;
- a map generator configured to generate a map comparing the first and second images; and
- an automatic white balancing (AWB) block configured to generate a first white point with respect to a first region illuminated by a first light source and a second white point with respect to a second region illuminated by a second light source different from the first light source.

17. The device of claim 16, further comprising:
- a white balancing unit configured to calculate weight values of a plurality of pixels in a boundary region between the first region and the second region using the map, and to generate a plurality of white points corresponding to the plurality of pixels in the boundary region using the first and second white points and the calculated weight values.

18. The device of claim 17, wherein the white balancing unit is further configured to perform a white balancing operation with respect to pixels in the first region using the first white point, to perform the white balancing operation with respect to pixels in the second region using the second white point, and to perform the white balancing operation with respect to the plurality of pixels in the boundary region using the corresponding generated plurality of white points.

19. The device of claim 17, wherein the first region comprises an outdoor region and the second region comprises an indoor region.

20. An image signal processor, comprising:
- an input unit configured to receive image data from an image sensor;
- a reconstruction unit configured to reconstruct bits of the image data received from the input unit to provide reconstructed image data; and
- the white balancing device of claim 18 configured to receive the reconstructed image data as the first image and to output white balanced image data.

* * * * *